United States Patent
Szemes et al.

(10) Patent No.: US 11,894,871 B2
(45) Date of Patent: Feb. 6, 2024

(54) SYSTEM AND METHOD FOR ESTABLISHING AN INTERVEHICLE COMMUNICATION

(71) Applicant: KNORR-BREMSE Systeme fuer Nutzfahrzeuge GmbH, Munich (DE)

(72) Inventors: Bence Szemes, Szekszard (HU); Huba Nemeth, Budapest (HU); Tamas Konya, Paks (HU); Gabor Toereki, Erd (HU); Kristof Hillier, Agard (HU); Benedek Pour, Budapest (HU)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 382 days.

(21) Appl. No.: 17/272,453

(22) PCT Filed: Jul. 30, 2019

(86) PCT No.: PCT/EP2019/070429
§ 371 (c)(1),
(2) Date: Mar. 1, 2021

(87) PCT Pub. No.: WO2020/043412
PCT Pub. Date: Mar. 5, 2020

(65) Prior Publication Data
US 2021/0320688 A1    Oct. 14, 2021

(30) Foreign Application Priority Data
Aug. 31, 2018    (EP) .................................... 18192102

(51) Int. Cl.
*H04W 76/10*    (2018.01)
*H04B 1/74*    (2006.01)

(52) U.S. Cl.
CPC .............. *H04B 1/74* (2013.01); *H04W 76/10* (2018.02)

(58) Field of Classification Search
CPC .......... H04L 12/28; H04L 12/50; H04W 1/74; H04W 76/10
(Continued)

(56) References Cited

U.S. PATENT DOCUMENTS

2014/0112666 A1    4/2014    Yeh
2016/0023587 A1    1/2016    Bean
(Continued)

FOREIGN PATENT DOCUMENTS

AU    2012101599 A4    11/2012
CN    101369932 A    2/2009
(Continued)

OTHER PUBLICATIONS

Japanese-language Office Action issued in Japanese Application No. 2021-510778 dated Dec. 13, 2022 with English translation (four (4) pages).
(Continued)

*Primary Examiner* — Dang T Ton
(74) *Attorney, Agent, or Firm* — Crowell & Moring LLP

(57) ABSTRACT

A system for establishing an intervehicle communication for at least a first and a second commercial vehicle includes several wireless and/or wired communication lines, at least one message sending module and at least one message receiving module. The message sending module is configured and arranged to send the at least one message over one or more lines. The message receiving module is configured to receive the message over one or more lines.

8 Claims, 2 Drawing Sheets

(58) Field of Classification Search
USPC .................. 370/329, 328, 400, 403
See application file for complete search history.

(56) References Cited

U.S. PATENT DOCUMENTS

| | | | |
|---|---|---|---|
| 2017/0217372 A1 | 8/2017 | Lu et al. | |
| 2018/0131539 A1 | 5/2018 | Michel et al. | |
| 2018/0205650 A1 | 7/2018 | Cooper et al. | |
| 2020/0378771 A1* | 12/2020 | Beaurepaire | G01C 21/3461 |

FOREIGN PATENT DOCUMENTS

| | | |
|---|---|---|
| CN | 106452932 A | 2/2017 |
| CN | 106487826 A | 3/2017 |
| DE | 10 2015 212 951 A1 | 1/2017 |
| EP | 2 216 913 A1 | 8/2010 |
| JP | 2004-88237 A | 3/2004 |
| JP | 2005-204218 A | 7/2005 |
| JP | 2018-56764 A | 4/2018 |

OTHER PUBLICATIONS

Japanese-language Office Action issued in Japanese Application No. 2021-510778 dated May 23, 2022 with English translation (nine (9) pages).
Chinese-language Office Action issued in Chinese Application No. 201980056492.7 dated Mar. 15, 2022 with partial English translation (nine (9) pages).
International Search Report (PCT/ISA/210) issued in PCT Application No. PCT/EP2019/070429 dated Sep. 24, 2019 (three (3) pages).
Written Opinion (PCT/ISA/237) issued in PCT Application No. PCT/EP2019/070429 dated Sep. 24, 2019 (six (6) pages).
Extended European Search Report issued in European Application No. 18192102.4 dated Nov. 19, 2018 (nine (9) pages).

* cited by examiner

SYSTEM AND METHOD FOR ESTABLISHING AN INTERVEHICLE COMMUNICATION

BACKGROUND AND SUMMARY OF THE INVENTION

The present invention relates to a system and method for establishing an intervehicle communication for at least a first and a second commercial vehicle.

Between the truck, trailer and multiple trailers wired communication interfaces (e.g. defined by the ISO 11992 standards) are widely used in the field of commercial vehicles. Especially with the rise of autonomous vehicles the need emerges to more reliably transmit significantly more amount of data. To support these signals, new communication solutions emerge, some using wireless communication interfaces.

An issue with the current communication solutions is that they all rely on a single physical link. If that link gets corrupted, all layers of the communication above get corrupted as well. When it comes to wireless solutions this issue is elevated, since even sources out of the vehicle can have harmful effects to the communication.

For example, weather and military radars can temporarily block wireless communication channels in the 5 GHz UNII bands, misbehaving high power device in close proximity can radiate disturbing signals or intentional harmful radiation can cause temporary outage in the targeted frequencies.

This invention is concerned with a redundant communication solution, which makes it possible to maintain communication even if some of the communication links are temporarily down.

DE 10 2015 212 951 A1 discloses an in-vehicle communication system having two parallel communication paths of sending the messages via either the first or the second communication path. This patent describes an intra-vehicle communication.

AU 2012 101 599 A4 discloses a wireless trailer brake control system for communicating braking information between a tow vehicle and a trailer using wireless communication, wherein the trailer control module is communicatively coupled to the trailer brake system of the trailer. However, reliability and redundancy are not considered by this prior art.

US 2017/0217372 A1 relates to a vision system where a camera is placed onto the trailer, the camera picture is transmitted wirelessly to the towing vehicle and the camera picture is presented on a screen in the towing vehicle. This prior art relates to camera picture transmission solely and does not take reliability and redundancy into account.

It is the object of the present invention to provide a system and method for establishing an intervehicle communication for at least a first and a second commercial vehicle, in particular wherein the reliability and redundancy of signal and information transmission in the intervehicle communication is enhanced and more reliability and redundancy is provided.

This object is achieved by a system for establishing an intervehicle communication according to the claimed invention. Accordingly, a system for establishing an intervehicle communication for at least a first and a second commercial vehicle is provided, comprising several wireless, wired and/or physical communication lines, further comprising at least one message sending module and at least one message receiving module, wherein the message sending module is configured and arranged to send the at least one message over one or more lines and wherein the message receiving module is configured to receive the message over one or more lines.

The invention is based on the basic idea that an intervehicle communication system is provided between vehicles in combination, in the field of commercial vehicles, e.g. such a combination can be a truck-trailer or a trailer-trailer in case of a road train scenario. The architecture shall contain multiple communication lines or links. The data or messages can be transferred over more than one communication links. The transmission of a message over the links can be simultaneously or can work in a warm backup manner. If one link fails, e.g. the quality of service drops below certain level, the backup immediately takes over the communication. Any of the redundant physical communication links can be wired or wireless. With such a redundancy provided, the reliability and availability of the intervehicle communication against unintentional or intentional disturbances can be significantly increased.

The system can further comprise at least one message transmission quality monitoring module, which is configured and arranged to monitor and/or assess the transmission quality of a message sent from the message sending module to the message receiving module. By monitoring the transmission quality it is possible for the system to find out, whether the message transmission quality is sufficient for stable and reliable communication. If it is found that the quality is below a threshold value, then specific counter measures may be triggered by such an event.

In particular, the message transmission quality monitoring module is configured and arranged to trigger an additional transmission of the message over one or more lines when a quality drop of transmission is detected. By this, it can be ensured that the necessary data transmission or communication is done, even in case that there is a quality drop in the transmission and that there are disturbances in signal transmission.

Furthermore, it is possible that at least two communication lines are non-overlapping wireless channels. By such a choice of wireless channels disturbances or noise within one channel is not effecting the other wireless channel. Consequently, a higher level of transmission security is reached.

The wireless channels may not be closer to each other than 50 MHz. If so, the channels have sufficient distance in frequencies between each other. Thus, the overall system may be more reliable and stayable as it is less vulnerable against disturbances.

Furthermore, it is possible that the communication over at least one of the wireless lines is in conformity with at least one of the standards: WiFi, Bluetooth, WAVE, ETSI ITS-G5, IEEE 802.15.4, C-V2X or the like. By using one of these standards a simplified implementation of such communication lines is possible. In particular, no own standard must be established. Also standard elements may be used and compatibility with other networks is possible.

Additionally, the present invention relates to a method for establishing an intervehicle communication. Accordingly, the method for establishing an intervehicle communication comprising at least the following steps:

providing several wireless and/or wired and/or physical communication lines;
send the at least one message over one or more lines; and
receive the message over one or more lines.

The message may be sent over at least two communication lines simultaneously.

Also, the message may be sent over at least two communication lines, wherein the second line is used in case that the first line is temporarily not in operation and/or the transmission quality is lowered and/or the transmission of the first line is corrupted.

Also, the method may be performed by using the system according to the system as described above.

Furthermore, the present invention relates to a message sending module for a system for establishing an intervehicle communication. The message sending module comprises the features of the message sending module as described in this disclosure. In particular, the message sending module may be a transceiver. Also, it is possible that the message sending module comprises a redundant sending capability, i.e. at least two sending elements being capable to transmit data and/or information, especially over the communication line to a message receiving module. For example, the message sending module can be capable to send or transmit messages over the two wireless channels. It may also comprise the capability for sending of messages over at least one wireless and at least one wired and/or physical line.

Additionally, the present invention relates to a message receiving module for a system for establishing an intervehicle communication. The message receiving module comprises the features of the message receiving module as described in this disclosure. In particular, the message receiving module may be a transceiver. Also, it is possible that the message receiving module comprises a redundant receiving capability, i.e. at least two receiving elements being capable to receive data and/or information, especially over the communication line to a message sending module. For example, the message receiving module can be capable to receive messages over the two wireless channels. It may also comprise the capability for receiving of messages over at least one wireless and at least one wired and/or physical line.

Further details and advantages shall now be described in connection with the figures.

DETAILED DESCRIPTION OF THE DRAWINGS

Figure 1:
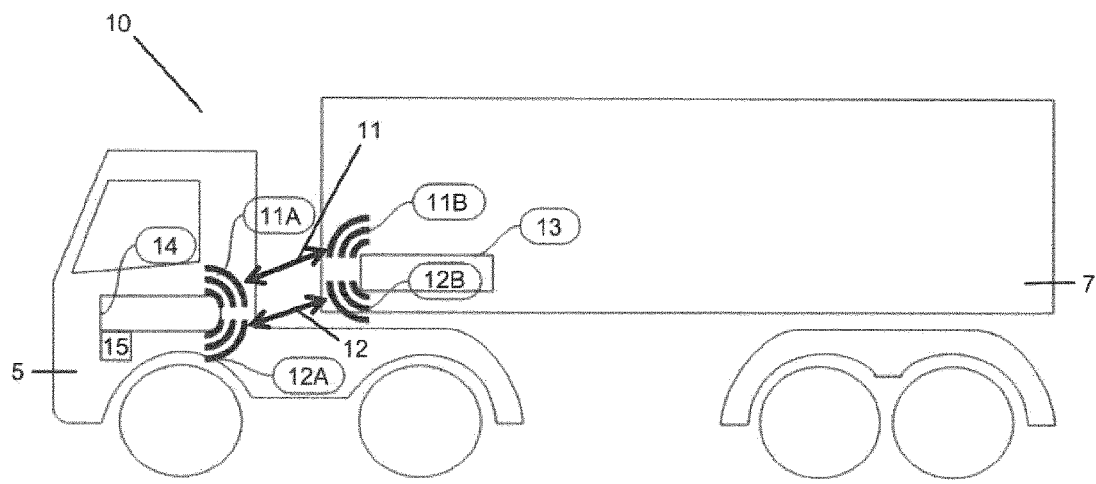
FIG. 1 is a schematic block diagram of a commercial vehicle combination, comprising a truck and a trailer, with a system for establishing an intervehicle communication according to an embodiment of the present invention.

FIG. 1 shows a schematical drawing commercial vehicle with the vehicle combination comprising a truck 5 and a trailer 7 equipped with a system 10 for establishing an intervehicle communication for at least a first and a second commercial vehicle, here between the truck 5 and the trailer 7.

In this embodiment, the tethered vehicles are the truck 5 and the trailer 7.

Generally speaking, it would be also possible that the tethered vehicles are a first trailer and a second trailer, e.g. in the scenario of a road train. In such a scenario, the tethered vehicles could be the truck, the first trailer and the second trailer.

Both vehicles have at least one communication ECU 13, 14.

The ECU 13 is the ECU of the trailer 7 and the ECU 14 is the ECU of the truck 5.

Both ECU 13, 14 are equipped with two or more communication links 11, 12.

The communication links 11, 12 may be wired or may be wireless. In the shown embodiment, the communication links 11, 12 are wireless.

Also, a physical communication link of any suitable kind could be used.

Here, the communication links 11, 12 are WiFi-connections.

The ECU 13 of the trailer has two respective transceivers 11B and 12B and the ECU 14 of the truck 5 has corresponding transceivers 11A and 12A.

The transceivers 11A, 11B and 12A, 12B form the message sending modules and message receiving modules of the system.

As the transceivers 11A, 11B and 12A, 12B are capable to send and receive, they form a module with integrated message sending and message receiving capability. Thus, they are at the same time a message sending module and a message receiving module and they are configured and arranged to send messages over one or more communication links/lines 11, 12 and they are configured to receive messages over one or more communication links/lines 11, 12.

The two or more WiFi channels/WiFi connections 11, 12 are far enough from each other in terms of frequency.

As an alternative to WiFi, the communication over at least one of the wireless lines can in conformity with at least one of the standards: Bluetooth, WAVE, ETSI ITS-G5, IEEE 802.15.4, C-V2X or the like.

A possible combination could be the use of Bluetooth additionally to the WiFi standard. So, one communication link could be a WiFi-link and another communication link could be a Bluetooth link.

Generally, it could be possible to use a first standard for a first link and a second standard for the second link, wherein the second standard is different from the standard used for the first link.

They may be arranged and configured as non-overlapping wireless channels 11, 12.

Thus, it is unlikely that the same source of disturbance harms both of them.

For example, the wireless channels 11, 12 can be chosen such that they are no closer to each other than 50 MHz.

Alternatively, one of the connections 11, 12 may be a WiFi link in the 5 GHz range and the other connection may be a Bluetooth link in the 2.4 GHz range.

The system 10 further comprises at least one message transmission quality monitoring module 15.

The message transmission quality monitoring module 15 is configured and arranged to monitor and/or assess the transmission quality of a message sent from the message sending module 11A, 11B, 12A, 12B to the message receiving module 11A, 11B, 12A, 12B.

Figure 2:
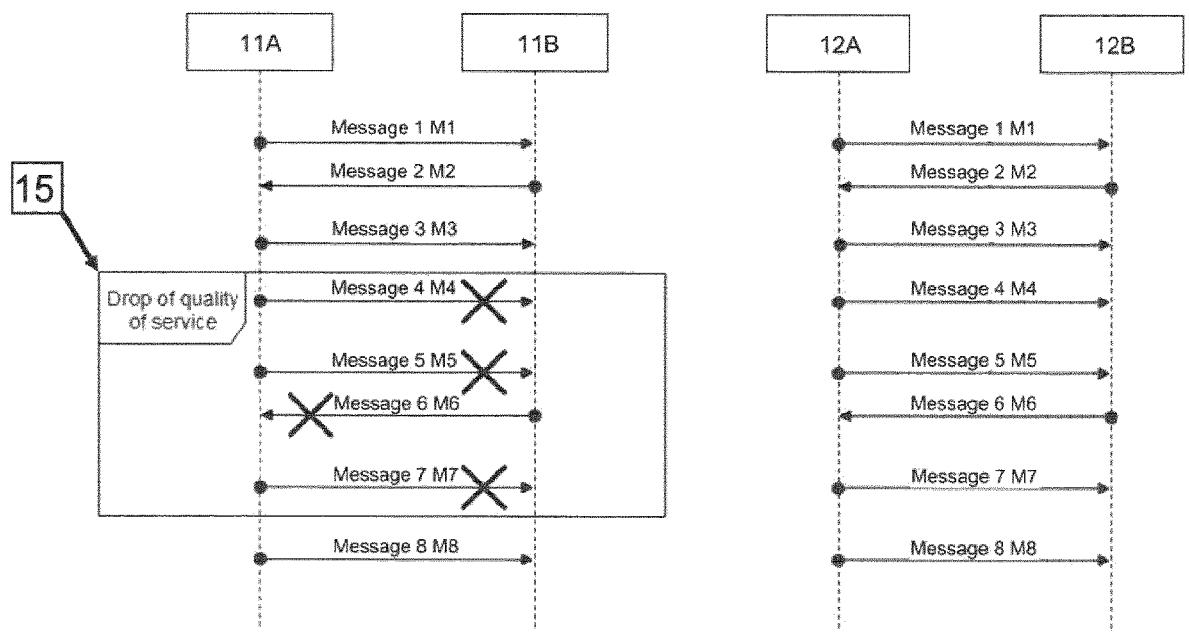
FIG. 2 is a timing diagram of simultaneous messaging.

In one embodiment as shown in FIG. 2, the data in form of messages M1, M2, M3, M4, M5, M6, M7 or M8 travel simultaneously over the communication link 11 from transceiver 11A to transceiver 11B and vice versa.

At the same time, the same messages M1, M2, M3, M4, M5, M6, M7 or M8 travel simultaneously over the other communication link 12 from transceiver 12A to transceiver 12B and vice versa.

If one of the communication links gets corrupted, as it is the case for the sent messages M4 to M7 in the communication link 11, even if that corruption is only temporary (here shown in case of a drop of quality of service of a certain, short amount of time) the other communication link 12 is still functional and therefore capable of transmitting data.

Such a drop of quality of service is detected by the message transmission quality monitoring module 15.

This module is measuring continuously the quality of service of the data or message transmission in the communication links 11, 12.

Consequently, the messages M4 to M7 will be sent and received correctly and even in such a case the intervehicle communication remains still active and can operate.

Here, the second channel or communication link 12 remains active and undisturbed and thus allows continuous communication.

Figure 3:
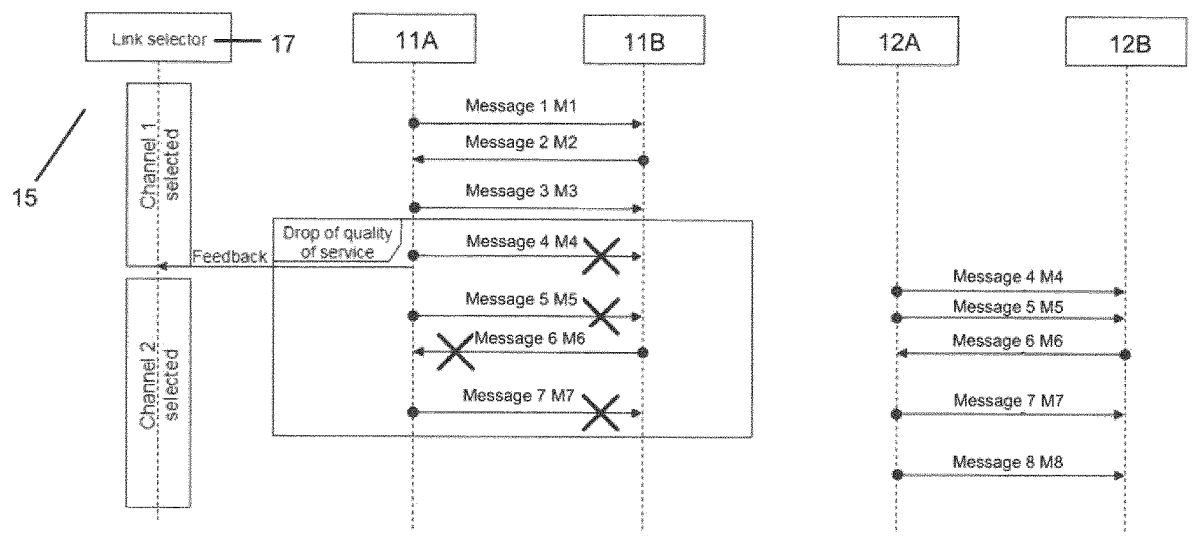
FIG. 3 is a timing diagram of redundant communication with standby, backup messaging.

In another embodiment as shown in FIG. 3, not all the communication links are continuously active.

In this embodiment, all structural and functional features of the system 3 as shown in FIG. 1 are present and realized.

Only the following differences are present and will be described below.

Here communications links 11 and 12 are provided.

The non-active link is the communication link 12 between the transceivers 12A and 12B.

The communication link 12 between the transceivers 12A and 12B stays in a standby, back-up state, ready for taking over communication when it is needed. This is, for example, the case, when there is a drop of quality of service between communication link 11 between the transceivers 11A and 11B.

The drop of service as shown in FIG. 3 affects the transmittal of messages M4 to M7.

To accomplish this, a link selector logic 17 is needed to be implemented on both vehicles, here the truck 5 and the trailer 7.

The link selector logic 17 can be part of the message transmission quality monitoring module 15.

The link selector logic 15 needs to be capable of determining when the quality of service of the active communication link drops below a threshold level. An advantage of such a solution is the more efficient use of spectrum in case of wireless links.

So, the message transmission quality monitoring module 15 is configured and arranged to trigger an additional transmission of the message over one or more lines, i.e. the communication links 11, 12 when a quality drop of transmission is detected.

REFERENCES

5 Truck
7 Trailer
10 System for establishing an intervehicle communication
11 Communication line, communication link
12 Communication line, communication link
11A Transceiver
11B Transceiver
12A Transceiver
12B Transceiver
13 Electronic control unit (ECU)
14 Electronic control unit (ECU)
15 Message transmission quality monitoring module
17 Link selector logic
M1 Message 1
M2 Message 2
M3 Message 3
M4 Message 4
M5 Message 5
M6 Message 6
M7 Message 7
M8 Message 8

The invention claimed is:

1. A system for establishing an intervehicle communication for at least a first and a second commercial vehicle, comprising:
several wireless, wired and/or physical communication lines between the first and second commercial vehicles;
at least one message sending module;
at least one message receiving module; and
at least one message transmission quality monitoring module, which is configured and arranged to monitor and/or assess transmission quality of a message sent from the message sending module to the message receiving module, wherein
the message sending module is configured and arranged to send the at least one message over one or more of the communication lines between the first and second commercial vehicles,
the message receiving module is configured to receive the message over one or more of the communication lines between the first and second commercial vehicles,
the message transmission quality monitoring module is configured and arranged to trigger an additional transmission of the message over one or more of the communication lines when a quality drop of transmission is detected,
the message is sent over at least two of the communication lines simultaneously, and
the at least two of the communication lines are non-overlapping wireless channels.

2. The system according to claim 1, wherein
the non-overlapping wireless channels are no closer to each other than 50 MHz.

3. The system according to claim 1, wherein
communication over at least one of the non-overlapping wireless channels is in conformity with at least one of the following standards: WiFi, Bluetooth, WAVE, ETSI ITS-G5, IEEE 802.15.4, or C-V2X.

4. A method for establishing an intervehicle communication for at least a first and a second commercial vehicle, comprising:
providing several wireless and/or wired communication lines between the first and second commercial vehicles;
sending at least one message over one or more of the communication lines;
receiving the message over one or more of the communication lines; and
monitoring and/or assessing transmission quality of a message sent from a message sending module to a message receiving module, wherein
an additional transmission of the message over one or more of the communication lines is triggered when a quality drop of transmission is detected,
the message is sent over at least two of the communication lines simultaneously, and
the at least two of the communication lines are non-overlapping wireless channels.

5. The method according to claim 4, wherein
the message is sent over the at least two of the communication lines, including a first line and a second line, wherein the second line is used in case the first line is temporarily not in operation, a transmission quality is low, and/or transmission of the first line is corrupted.

6. The method according to claim 4, wherein the method is performed using the system according to claim 1.

7. A message sending module for a system for establishing an intervehicle communication according to claim 1, wherein the message sending module is configured and arranged to send the at least one message over one or more lines.

8. A message receiving module for a system for establishing an intervehicle communication according to claim 1, wherein
the message receiving module is configured to receive the message over one or more lines.

\* \* \* \* \*